United States Patent
Pecher

(10) Patent No.: US 7,599,804 B2
(45) Date of Patent: Oct. 6, 2009

(54) METHOD FOR DETECTING STRUCTURE-BORNE NOISE EVENTS IN A ROLLER BEARING

(75) Inventor: Alfred Pecher, Stadtlauringen (DE)

(73) Assignee: FAG Kugelfischer AG (DE)

( * ) Notice: Subject to any disclaimer, the term of this patent is extended or adjusted under 35 U.S.C. 154(b) by 655 days.

(21) Appl. No.: 10/543,844

(22) PCT Filed: Jan. 23, 2004

(86) PCT No.: PCT/DE2004/000095

§ 371 (c)(1),
(2), (4) Date: Aug. 29, 2005

(87) PCT Pub. No.: WO2004/068100

PCT Pub. Date: Aug. 12, 2004

(65) Prior Publication Data

US 2006/0150737 A1    Jul. 13, 2006

(30) Foreign Application Priority Data

Jan. 31, 2003  (DE)  ............................. 103 03 877

(51) Int. Cl.
*G01M 13/04* (2006.01)

(52) U.S. Cl. .................. 702/39; 702/34; 702/35; 702/56; 73/593

(58) Field of Classification Search .......... 702/33–36, 702/39, 54, 56; 73/572, 593, 460, 462; 384/1, 384/18, 44, 46, 48, 50–59
See application file for complete search history.

(56) References Cited

U.S. PATENT DOCUMENTS

| | | | |
|---|---|---|---|
| 5,365,787 A * | 11/1994 | Hernandez et al. ............ | 73/660 |
| 5,602,761 A * | 2/1997 | Spoerre et al. .............. | 702/179 |
| 5,852,793 A * | 12/1998 | Board et al. ................. | 702/56 |
| 6,208,944 B1 * | 3/2001 | Franke et al. ................ | 702/56 |
| 6,567,752 B2 * | 5/2003 | Cusumano et al. ............ | 702/34 |

(Continued)

FOREIGN PATENT DOCUMENTS

DE    199 02 326    8/2000

(Continued)

OTHER PUBLICATIONS

International Search Report for PCT/DE2004/000095 dated Jul. 5, 2004.

*Primary Examiner*—Eliseo Ramos Feliciano
*Assistant Examiner*—Mi'schita' Henson
(74) *Attorney, Agent, or Firm*—Ostrolenk Faber LLP

(57) ABSTRACT

A method for detecting structure-borne noise events in a roller bearing, wherein a measuring signal M of a pressure or dilatation sensor arranged on a roller bearing is fed to a frequency filter for filtering out undesired signal parts. A first variance value is calculated from digital values of the frequency filter output signal and at least one second variance value is calculated from other digital values of the frequency filter output signal and a weighted arithmetic average of the at least two variance values is calculated with the aid of a recursive calculation of the variance value. If the weighted arithmetic variance average value exceeds a pre-selected variance threshold value, then it is assessed that a structure-borne noise event provoked by mechanical damage to the roller bearing has occurred.

9 Claims, 4 Drawing Sheets

U.S. PATENT DOCUMENTS

| | | | |
|---|---|---|---|
| 6,883,373 B2 * | 4/2005 | Dyer | 73/462 |
| 6,889,553 B2 * | 5/2005 | Robinson et al. | 73/649 |
| 6,999,884 B2 * | 2/2006 | Astley et al. | 702/56 |
| 7,039,557 B2 * | 5/2006 | Mayer et al. | 702/184 |
| 7,136,794 B1 * | 11/2006 | Bechhoefer | 703/7 |
| 2002/0013664 A1 * | 1/2002 | Strackeljan et al. | 702/34 |
| 2006/0110086 A1 * | 5/2006 | Morita et al. | 384/448 |

FOREIGN PATENT DOCUMENTS

| | | |
|---|---|---|
| DE | 19943689 | 3/2001 |
| DE | 10136438 | 3/2002 |
| DE | WO03023721 A2 * | 3/2003 |
| EP | 0 889 316 | 1/1999 |
| GB | 1 514 792 | 6/1978 |
| JP | 363304127 A * | 12/1988 |

* cited by examiner

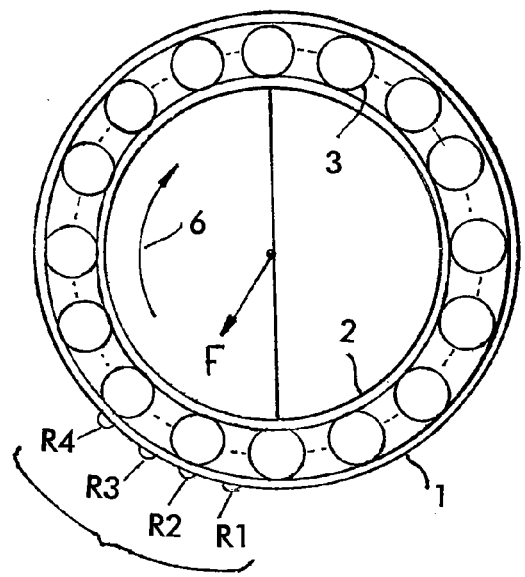
FIG. 1
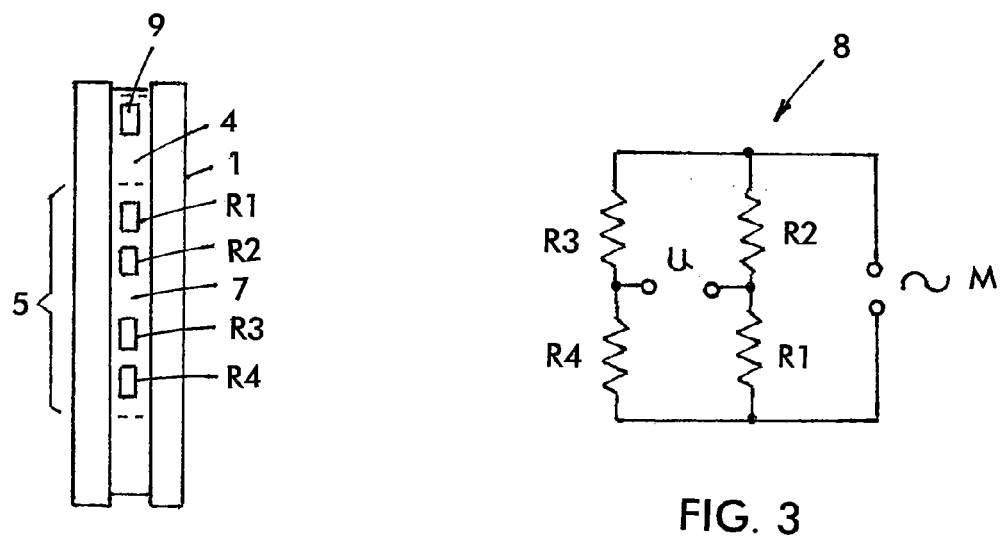
FIG. 2
FIG. 3

METHOD FOR DETECTING STRUCTURE-BORNE NOISE EVENTS IN A ROLLER BEARING

CROSS REFERENCE TO RELATED APPLICATION

The present application is a 35 U.S.C. §§ 371 national phase conversion of PCT/DE2004/000095, filed 23 Jan. 2004, which claims priority of German Application No. 103 03 877.9, filed 31 Jan. 2003. The PCT International Application was published in the German language.

FIELD OF APPLICATION OF THE INVENTION

The invention relates to a method for detection of structure-borne noise events in a roller bearing.

BACKGROUND OF THE INVENTION

DE 199 43 689 A1 discloses a method and an apparatus for monitoring and/or diagnosis of moving machines and/or machine parts. The aim of such measurement and evaluation methods is to identify damage to a machine or to a machine part such as a roller bearing as early as possible in order to make it possible to replace this item, when appropriate, before its total failure.

In this known method, oscillations and structure-borne sound waves which are produced by the machines or machine parts are recorded by means of an acceleration sensor as a broadband time signal, and are passed to an evaluation device. The measurement signal is digitized in this evaluation device, and a relatively large range of such digital values are stored. This data is subjected to frequency analysis by means of a fast Fourier transformation in a subsequent calculation process. The process of carrying out a fast Fourier transformation such as this is highly complex and requires a comparatively large amount of computation capacity and memory space.

Furthermore, this document discloses the broadband time signal being subjected to discrete filtering using different analysis methods.

During this process, frequency components of the signal components caused by the damage are filtered out from the measurement signal, and an amplitude profile of this component is evaluated. Changes in the frequencies can extend the evaluation to adjacent signal components in such a way that the local amplitude maxima can be determined. The computation complexity for carrying out discrete filtering is admittedly less than that of such a conventional Fourier transformation, but it is nevertheless comparatively high since the cut-off frequencies of the filter must be dynamically matched to different rotation speeds of the shaft/bearing system.

Finally, DE 101 36 438 A1 discloses a sensor arrangement in which strain gauges are arranged in a circumferential groove in a stationary roller bearing ring, where they are connected to signal-electronic modules, by means of which a signal evaluation process can be carried out directly in the circumferential groove in the roller bearing ring. Since this circumferential groove is comparatively small, the signal-electronic modules which are arranged there may have only a quite modest storage and computation capacity, so that the evaluation methods described above are not carried out in situ and, so to speak "on-line".

OBJECT OF THE INVENTION

Against this background, the object of the invention is to provide a method for detecting structure-borne sound waves and structure-borne sound or noise events for a measurement apparatus which, by way of example, is arranged in a roller bearing. By this method, the required analysis steps can be carried out directly at the point at which the measurement signals are obtained, without a large amount of computation capacity and without requiring a large memory space. A further aim is for the measurement signal from suitable sensors on the roller bearing to be converted such that it is possible to make an unambiguous statement about the actual presence of bearing damage in a better manner than in the past. A final aim is to be able to carry out this method sufficiently quickly that suddenly occurring bearing damage can be detected preferably "online", that is to say without any time delay.

SUMMARY OF THE INVENTION

These objects are achieved by the features in the main claim, while advantageous refinements and developments of the invention can be found in the dependent claims.

Accordingly, the method provides that, in order to detect structure-borne sound or noise events in a roller bearing, the measurement signal from a pressure-sensitive or strain-sensitive sensor which is arranged on a roller bearing is first of all supplied to a frequency filter in order to filter out undesired signal components. A first variance value is then calculated from the digital values of the frequency filter output signal, and at least one second variance value is determined from subsequent digital values of the frequency filter output signal. The weighted arithmetic mean of these variance values is then calculated from these at least two variance values (new variance, old variance) with the aid of a recursive calculation. If the weighted arithmetic mean value is above a preselected variance threshold value, this is assessed as a structure-borne sound event, which has been caused by mechanical damage to the roller bearing.

In this context, the expression "recursive calculation" means that result values from a first variance calculation are included in the calculation of a second variance value. This allows consistent estimation of the structure-borne sound amplitude on the basis of only two sample values without any need to provide additional storage capacity in an evaluation device.

The weighted arithmetic variance mean value is determined with the aid of the following basic recursive equation:

$$\overline{E}\{X^2\}(k+1) = \overline{E}\{X^2\}(k) + C_x^2 [X^2(k+1) - \overline{E}\{X^2\}(k)] \quad \text{(Equation 1)}$$

where $\overline{E}\{.\}$ represents the expected value of the weighted arithmetic mean value, k is a running variable, x is a digital sample value of the frequency filter output signal, and $C_x$ is an adaptation constant.

With regard to the adaptation constant C, a value is provided which is less than unity and is greater than zero, and which can be calculated from the equation for the so-called adaptation rate:

$$t = \{1/C_x^2 - \frac{1}{2}\} * T \quad \text{(Equation 2)}.$$

In this expression, t indicates how quickly the true variance can be determined with a tolerable error rate.

The basic recursive equation (equation 1) can be used to form a simplified recursive equation $$nE = aE + aK * (nA - aE) \quad \text{(Equation 3)}$$

in which nE represents a new result value, equal to $\overline{E}\{x^2\}(k+1)$, aE represents an old result value, equal to $\overline{E}\{x^2\}(k)$, aK represents the adaptation constant, equal to $C_x$, and nA represents a new sample value, equal to $x^2(k+1)$. The "new result value" is in this case the value to be calculated at any given time, while the "old result value" denotes the value calculated one sample clock period early.

This simplified recursive equation can be expressed for the evaluation process as an evaluation equation:

$$nV = aV + aK^*(nA - aV) \quad \text{(Equation 4)}$$

where nV represents the new variance, equal to nE, aV represents the old variance, equal to aE, aK represents the adaptation constant, and nA represents the new sample value, equal to nA.

A new variance calculated in this way is assessed as an estimated value for the true variance of the measurement signal from which the presence of structure-borne sound events in the roller bearing is deduced. In this case, a high new variance value represents major damage in the roller bearing.

As is evident from the above statements, the method according to the invention can be used to detect the presence of structure-borne sound waves and structure-borne sound events from a measurement apparatus that is arranged in a roller bearing, by means of an evaluation device which does not have a large memory space and has quite a small computation capacity. Evaluation devices such as these may be microcomputers which are arranged directly at the point at which the measurement signal is obtained, for example in the circumferential groove in a roller bearing, and which carry out the necessary analysis steps in order to detect bearing damage.

Furthermore, the method according to the invention allows the measurement signal from a suitable sensor, such as a strain gauge, on the roller bearing, to be converted such that an unambiguous statement about the actual presence of bearing damage is possible in a better manner than with previously known methods. Finally, the method makes it possible to identify structure-borne sound waves using only a small number of measurement values sufficiently quickly that suddenly occurring bearing damage can be detected preferably "on-line", that is to say without any time delay.

BRIEF DESCRIPTION OF THE DRAWINGS

The method according to the invention, its interaction with a measurement roller bearing and an evaluation device can best be explained on the basis of exemplary embodiments of the invention, which are illustrated in a drawing, in which:

FIG. 1 shows a schematic cross section through a measurement roller bearing,

FIG. 2 shows a plan view of a measurement arrangement in a circumferential groove in the measurement roller bearing shown in FIG. 1, FIG. 3 shows an electrical measurement bridge circuit for the measurement arrangement shown in FIG. 2.

DETAILED DESCRIPTION OF THE DRAWINGS

Figure 4:
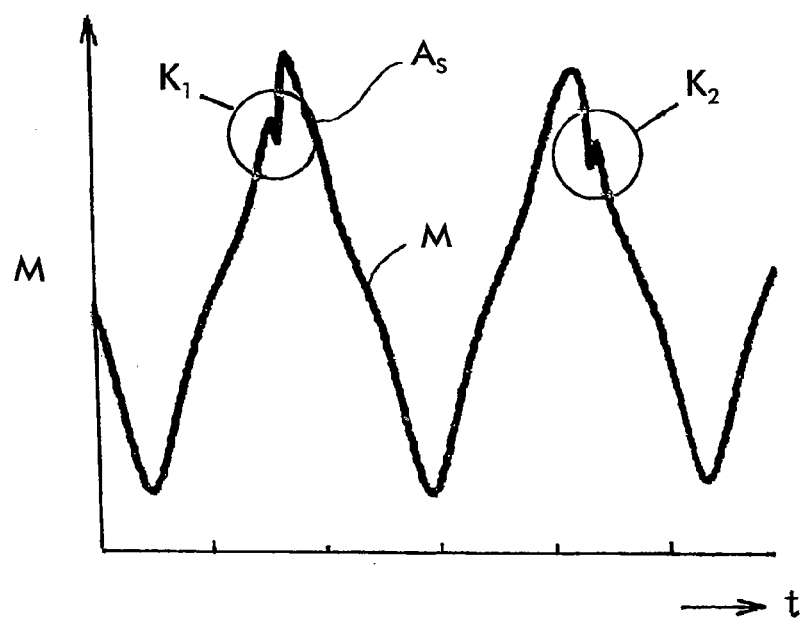
FIG. 4 shows a measurement signal profile with frequency components which indicate damage in the roller bearing.

FIG. 1 accordingly shows a schematic cross-section illustration through a roller bearing in which roller bodies 3 are arranged between a stationary outer ring 1 and an inner ring 2 which can rotate, such that the inner ring 2 is mounted, for example, such that it can rotate in a direction 6. This inner ring 2 is used to hold a component that is not illustrated here but which exerts a force F on the inner ring 2. As can be seen from this illustration, the force F acts via the inner ring 2 and the roller bodies 3 on the outer ring 1, such that the roller bodies 3 produce a periodic deformation, which can be measured by suitable sensors, at their moving contact points on the outer ring 1.

Measurement resistors R1, R2, R3, R4 are thus attached to the circumferential surface of the outer ring 1 in a measurement area 5. These resistors change their electrical resistance as a function of strain and by means of which the deformation of the outer ring 1 can thus be detected as the roller bodies 3 roll over each measurement resistor R1, R2, R3, R4. One important factor in this context, however, is that, in terms of the distances between them, the resistors R1, R2, R3, R4 must not be separately aligned.

As can be seen from FIG. 2, the measurement resistors R1, R2, R3, R4 in this exemplary embodiment of the measurement roller bearing are arranged in a circumferential groove 4 in the outer ring 1 in an attachment area 7 such that they are positioned parallel to the axis of the movement direction of the inner ring 2. The resistors R1, R2, R3, R4 are in this case connected to one another to form a measurement bridge 8, whose circuit layout is illustrated in FIG. 3. This measurement bridge 8 has a voltage U applied to it in a manner known per se, and produces a largely sinusoidal measurement signal M via the contact points. This measurement signal M can be supplied to an evaluation device 9, which may be fitted in the groove 4 in the bearing outer ring, via conductor tracks which are not illustrated here, and in which signal analysis may be carried out.

FIG. 4 shows the typical time profile of a measurement signal M such as this. As can be seen from the signal profile, a higher-frequency signal is superimposed on the sinusoidal basic signal and, in this illustration, is marked with the circles $K_1$ and $K_2$. The higher-frequency signal component is of particular interest for analysis of the measurement signal M, since it indicates damage in the bearing.

Unfortunately, in the case of measurement signals such as these, the signal level of the sinusoidal basic signal M is very much higher than that of the higher-frequency signal component. The measurement signal M thus has to be evaluated separately in order to separate the higher-frequency signal from the basic signal component and to make it possible to unambiguously distinguish it from a noise signal which is always present and which has an amplitude that is often of similar magnitude. For this purpose, the measurement signal M from the measurement apparatus 8 is first passed to a frequency filter, which removes the undesirable frequency components from the measurement signal M. A frequency filter such as this can be designed such that it filters the analog or else preferably the already digitized measurement signal using appropriately preselected prior settings, and emits digital signals.

Figure 5:
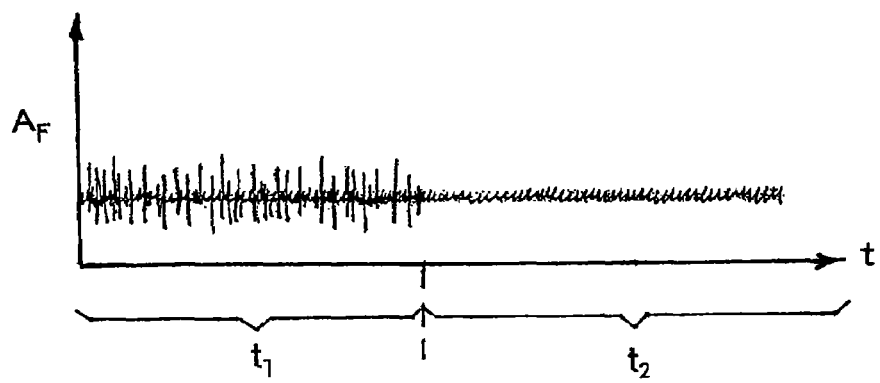
FIG. 5 shows two measurement signals after passing through a frequency filter.

FIG. 5 shows the result of such frequency filtering. In this case, the illustration shows a filtered measurement signal for a damaged roller bearing in a left-hand time period $t_1$, and a filtered measurement signal for an undamaged roller bearing in the right-hand time period $t_2$. The time $t_n$ marks the signal change from a damaged roller bearing to an undamaged roller bearing. As can clearly be seen from this illustration, the frequency filtering of the measurement signal itself results in an improvement in terms of the capability to identify higher-frequency signal components, but the ratio of the amplitudes $A_S$ of the higher-frequency measurement signal component to the amplitudes of the noise signal is still comparatively small. This noise component in the time period $t_2$ is precisely that signal profile which indicates an undamaged roller bearing, since the sinusoidal basic signal which was produced as the roller bodies 3 rolled past the respective measurement point 5 has been removed by the filtering process.

Since this noise separation is very small, the detection sensitivity for bearing damage that is to be detected is initially also comparatively poor. The evaluation method according to the invention now overcomes this in that, inter alia, it creates a very much greater separation between the structure-borne sound signal and the noise signal. Furthermore, an unambiguous statement about the presence of bearing damage can be made with only a very small number of digital measurement values.

For this purpose, the invention provides that a first variance value is first calculated from digital values of the output signal from the frequency filter (the signal profile shown in FIG. 5), that at least one second variance value is then determined from further digital values of the frequency filter output signal, and that the weighted arithmetic mean of these variance values is calculated from these at least two variance values (the new variance, the old variance) with the aid of a recursive calculation. The variance in this case, as is known, represents the square of the standard deviation, which in turn indicates how the individual measurement values are scattered about a mean value.

Since a large weighted arithmetic variance mean value means that the investigated measurement signal component differs to a major extent from the sinusoidal basic signal or the noise signal, its exceeding of a predetermined variance threshold value $V_{SW}$ can be assessed as a structure-borne sound event which has been caused by mechanical damage to the roller bearing.

Figure 6:
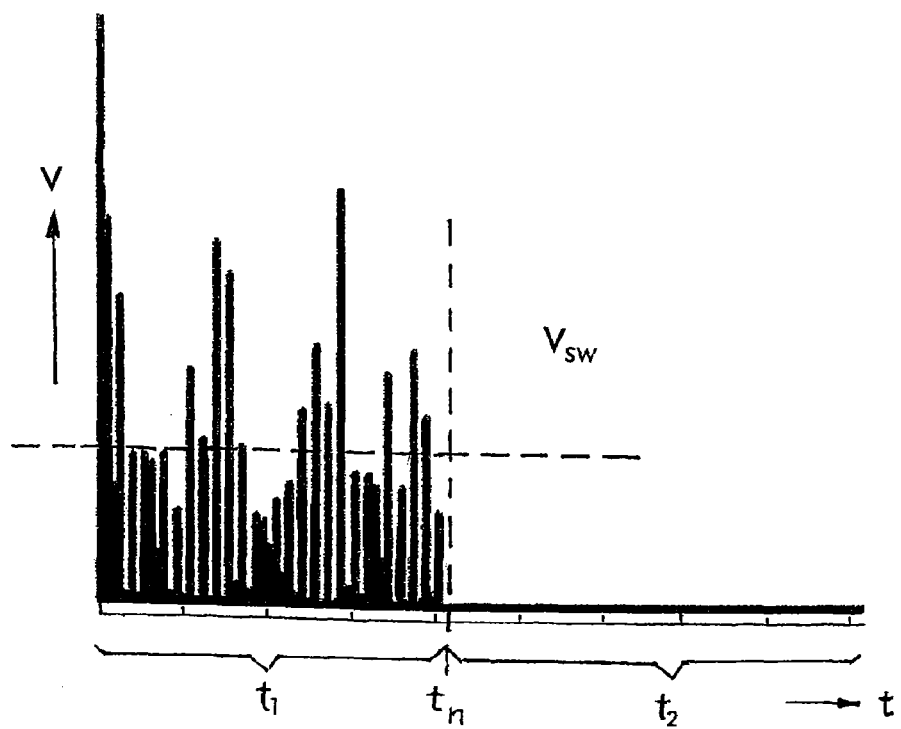
FIG. 6 shows the illustration of the variance mean values for the two measurement signals shown in FIG. 5.
Figure 7:
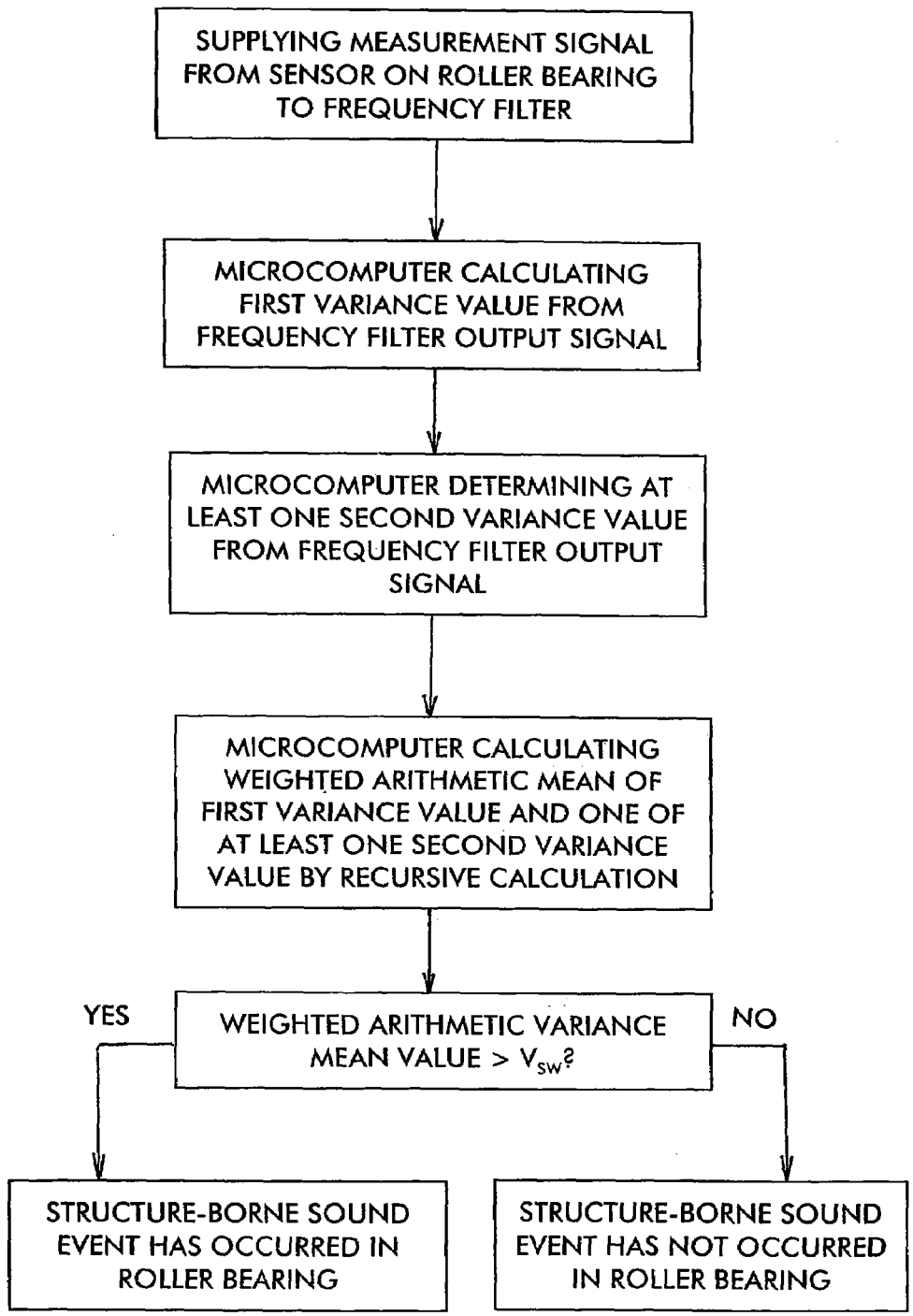
FIG. 7 shows a flow chart summarizing the method according to the invention.

FIG. 6 clearly shows, for a damaged roller bearing in the left-hand section of the diagram, how unusually large the separation is between the variance values V for this damaged roller bearing in a time period $t_1$ and the variance value for an undamaged roller bearing in a time period $t_2$. As can likewise be seen from this illustration, the exceeding of the calculated variance values V in comparison to a variance threshold value $V_{SW}$ as shown here unambiguously indicate the presence of structure-borne sound events, and thus damage in the roller bearing.

The invention claimed is:

1. A method for detecting structure-borne sound events in a roller bearing, comprising:
   supplying a measurement signal (M) from a pressure-sensitive or strain-sensitive sensor which is arranged on the roller bearing to a frequency filter for filtering out undesirable signal components;
   a microcomputer calculating a first variance value from digital values of the frequency filter output signal;
   the microcomputer determining at least one second variance value from further digital values of the frequency filter output signal;
   the microcomputer calculating a weighted arithmetic mean of the first variance value and one of the at least one second variance value using a recursive calculation; and
   the microcomputer assessing any exceeding of the weighted arithmetic variance mean value above a preselected variance threshold value ($V_{SW}$) as a structure-borne sound event which has been caused by mechanical damage to the roller bearing, and the frequency for exceeding the threshold value can be associated with the point of origin of the damage in the bearing when a rotation speed and geometric conditions of the bearing are known;
   wherein the weight used in calculating the weighted arithmetic mean of the variance values is a constant with respect to a particular recursive calculation.

2. The method as claimed in claim 1, comprising calculating the weighted arithmetic mean of the variance values using the basic recursive equation:

$$\overline{E}\{X^2\}(k+1)=\overline{E}\{X^2\}(k)+C_x^2[X^2(k+1)-\overline{E}\{X^2\}(k)] \qquad \text{(Equation 1)}$$

where $\overline{E}\{.\}$ represents the expected value of the weighted arithmetic mean value, k is a running variable, x is a digital sample value of the frequency filter output signal, and the weight is denoted by $C_x$, which is an adaptation constant.

3. The method as claimed in claim 2, wherein the adaptation constant $C_x$ has a value which is less than unity and greater than zero.

4. The method as claimed in claim 3, wherein the adaptation constant $C_x$ can be calculated from an equation for the adaptation rate $$t=\{1/C_x^2-\tfrac{1}{2}\}*T \qquad \text{(Equation 2)}$$

where t indicates how quickly the true variance can be determined with a tolerable error rate and T is the time between consecutive digital sample values of the frequency filter output signal.

5. The method as claimed in claim 2, wherein the basic recursive equation (equation 1) is expressed as a simplified recursive equation $$nE=aE+aK*(nA-aE) \qquad \text{(Equation 3)}$$

in which nE represents a new result value of the variance, aE represents an old result value of the variance, aK represents the adaptation constant, and nA represents a new sample value of the frequency filter output signal.

6. The method as claimed in claim 5, wherein the simplified recursive equation is expressed as an evaluation equation $$nV=aV+aK*(nA-aV) \qquad \text{(Equation 4)}$$

where nV represents the new variance, aV represents the old variance, aK represents the adaptation constant, and nA represents the new sample value of the frequency filter output signal.

7. The method as claimed in claim 6, further comprising assessing the value of the new variance as an estimated value of the true variance of the measurement signal, which marks the presence of structure-borne sound events in the roller bearing.

8. The method as claimed in claim 6, wherein a high new variance value represents a high probability of the presence of structure-borne sound events in the roller bearing.

9. The method as claimed in claim 6, wherein a high new variance value represents major damage in the roller bearing.

* * * * *